United States Patent
Schleiff

(10) Patent No.: US 10,158,490 B2
(45) Date of Patent: Dec. 18, 2018

(54) DOUBLE AUTHENTICATION SYSTEM FOR ELECTRONICALLY SIGNED DOCUMENTS

(71) Applicant: THE BOEING COMPANY, Chicago, IL (US)

(72) Inventor: Martin Schleiff, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/827,685

(22) Filed: Aug. 17, 2015

(65) Prior Publication Data

US 2017/0054561 A1 Feb. 23, 2017

(51) Int. Cl.
| | |
|---|---|
| H04L 9/32 | (2006.01) |
| G06Q 20/40 | (2012.01) |
| H04L 29/06 | (2006.01) |
| H04L 9/30 | (2006.01) |

(52) U.S. Cl.
CPC ......... *H04L 9/3234* (2013.01); *G06Q 20/409* (2013.01); *H04L 9/30* (2013.01); *H04L 9/3226* (2013.01); *H04L 9/3231* (2013.01); *H04L 9/3242* (2013.01); *H04L 63/0853* (2013.01)

(58) Field of Classification Search
CPC ... H04L 9/3234; H04L 9/3242; H04L 9/3231; H04L 9/30; H04L 9/3226; H04L 63/0853; G06Q 20/409
See application file for complete search history.

(56) References Cited

U.S. PATENT DOCUMENTS

| | | | | |
|---|---|---|---|---|
| 5,966,445 | A * | 10/1999 | Park | H04L 9/3257 380/30 |
| 5,979,773 | A * | 11/1999 | Findley, Jr. | G06Q 20/206 235/380 |
| 6,553,494 | B1 * | 4/2003 | Glass | G06F 21/32 713/176 |
| 2002/0013898 | A1 * | 1/2002 | Sudia | G06Q 20/02 713/155 |
| 2003/0055738 | A1 * | 3/2003 | Alie | G06Q 20/04 705/26.1 |
| 2003/0111528 | A1 * | 6/2003 | Sato | G06Q 20/105 235/380 |
| 2003/0177353 | A1 * | 9/2003 | Hiltgen | G06F 21/34 713/161 |
| 2003/0177392 | A1 * | 9/2003 | Hiltgen | G06F 21/34 713/172 |
| 2003/0185417 | A1 * | 10/2003 | Alattar | G06T 1/0064 382/100 |
| 2005/0195975 | A1 * | 9/2005 | Kawakita | H04L 9/0822 380/30 |
| 2006/0288216 | A1 * | 12/2006 | Buhler | H04L 9/3234 713/176 |

(Continued)

OTHER PUBLICATIONS

European Patent Office Extended European Search Report, Application No. 1617871.2-1853, dated Dec. 21, 2016.

*Primary Examiner* — Izunna Okeke
*Assistant Examiner* — Cheng-Feng Huang

(57) ABSTRACT

Disclosed is a double authentication system ("DAS") for electronically signing a first data from a user having a smart card, where the smart card has a personal identification number ("PIN"). As an example, the DAS may include a client module, high assurance signing service ("HASS") module, and hardware security module ("HSM").

18 Claims, 5 Drawing Sheets

(56) References Cited

U.S. PATENT DOCUMENTS

| | | | |
|---|---|---|---|
| 2009/0093269 A1* | 4/2009 | Lee | H04W 48/18 455/552.1 |
| 2011/0289576 A1 | 11/2011 | Cheng | |
| 2012/0066349 A1* | 3/2012 | Trotter | G06F 19/323 709/219 |
| 2012/0284787 A1* | 11/2012 | Clemot | G06F 21/34 726/7 |
| 2013/0297933 A1 | 11/2013 | Fiducia et al. | |
| 2014/0189808 A1 | 7/2014 | Mahaffey et al. | |
| 2015/0022773 A1 | 1/2015 | Kim et al. | |
| 2015/0227738 A1* | 8/2015 | Katoh | G09C 1/00 713/168 |
| 2015/0324789 A1* | 11/2015 | Dvorak | G06Q 20/3823 705/67 |

* cited by examiner

DOUBLE AUTHENTICATION SYSTEM FOR ELECTRONICALLY SIGNED DOCUMENTS

BACKGROUND

1. Field

The present invention is related to data security and, more particularly, to double authentication of electronic communication.

2. Related Art

Often security of electronic documents associated with business and banking employ electronic signing of documents to assure their authenticity and assure that the person submitting the document is not an imposter. The known approaches for securing electronic documents often require a smart card (also known as chip card or integrated circuit card ("ICC")) that contains a private key, the use of which is controlled with a personal identification number ("PIN"). In general, smart cards may provide identity documentation, authentication, data storage, and application processing. In operation, a public key corresponding to the private key exists such that any data encrypted with the private key can only be decrypted by the public key, likewise any data encrypted with the public key can only be decrypted with the private key. As an example, when a document needs an electronic signature, the smart card may be accessed with information derived from the document and then a code is generated. At a later time, the integrity of the document can be verified by use of the document, the code, and the corresponding public key. As such, in this example, the electronic signing of the document is actually electronically securing the document and not just simply adding an electronic signature that only represents the signature of a user as if, for example, the user had physically signed a paper document. At present, numerous companies provide smart card security equipment, such as, for example, CHIP-DRIVE, DOTINDOTS, SMART SIGN PROJECT, TODOS DATA SYSTEM AB.

Unfortunately, while smart cards do provide a certain level of security, they are nonetheless susceptible to some modern types of security attacks. As an example, a known approach at attempting to breach smart cards includes the utilization of malware such as, for example, sykipot, which initially operates as a keystroke logger for recording a user's PIN number and then (when the smart card is still in place) it utilizes the recorded PIN to electronically sign data on behalf of the user without the knowledge of the user. As such, smart cards usually fail to protect documents from determined hackers and intelligence agencies. Moreover, another problem that exists with the use of smart cards is that the client has a direct communication with the smart card and, therefore, may access other information on the smart card without the knowledge, knowing consent, or both of the user of the smart card. Additional security problems also exist with smart cards that include the emulation of smart cards.

Furthermore, the actual operation of a given smart card may also provide insight to hackers regarding the types of encryption being employed by the smart card. An example of this type of hacker attack includes utilizing a differential power analysis that measures the precise time and electric current required for certain encryption or decryption operations. From these measurements, an attacker may deduce the on-chip private key utilized by a public key algorithm such as, for example, the Rivest, Shamir, and Adleman algorithm ("RSA"), one of the first practical public-key cryptosystems that is widely used for secure data transmission. Additionally, some implementations of symmetric ciphers may be vulnerable to timing or power attacks as well. Furthermore, smart cards may be physically disassembled by using acid, abrasives, or some other technique to obtain unrestricted access to the on-board microprocessor. Although such techniques involve a fairly high risk of permanent damage to the chip on the smart card, and irrecoverable loss of the secret keys therein, they nevertheless are capable of permitting the collection of much more detailed information.

As such, there is a need for a secure approach for electronically signing documents that prevents hackers from electronically signing documents unbeknownst to the authorized signer.

SUMMARY

Disclosed is a double authentication system ("DAS") for electronically signing a first data from a user having a smart card, where the smart card has a personal identification number ("PIN"). As an example, the DAS may include a client module, high assurance signing service ("HASS") module, and hardware security module ("HSM"). The client module is configured to be in signal communication with the smart card and the HASS module is in signal communication with the client module and the HSM. The HASS module is configured to receive the first data, and, in response, query the user for a confirmation that the first data is to be electronically signed. The HSM has a private key and is configured to receive a HSM package from the HASS module, and, in response, produce a HSM encrypted hash value with the private key of the HSM. The HSM then passes the HSM encrypted hash value to the HASS module. The HASS module is further configured to produce the HSM package from at least the first data and a HSM signed package that includes the HSM package combined with the HSM encrypted hash value. Moreover, the HASS is configured to pass the HSM signed package to the client module. The client module is configured to query the user for the PIN of the smart card and, in response, pass the HSM signed package to the smart card for production of a smart card ("SC") encrypted hash value. The client module is also configured to receive the SC encrypted hash value, and pass the SC encrypted hash value to the HASS module, where the HASS module is configured to receive the SC encrypted hash value and, in response, produce a high assurance signed package ("HAS package").

As an example of operation, the DAS performs a method that includes the steps of receiving the first data from the user at the HASS module of the DAS, querying the user for a confirmation that the first data is to be electronically signed, and generating the HSM package for transmission to the HSM. The DAS then generates the HSM encrypted hash value from the HSM package with the private key of the HSM, generates the HSM signed package (where the HSM signed package includes the HSM package and the HSM encrypted hash value), and queries the user for the PIN. The DAS then passes the HSM signed package to the smart card and, in response, receives the SC encrypted hash value corresponding to the HSM signed package. In response, the DAS produces the HAS package from the HSM signed package and SC encrypted hash value.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

Figure 1:
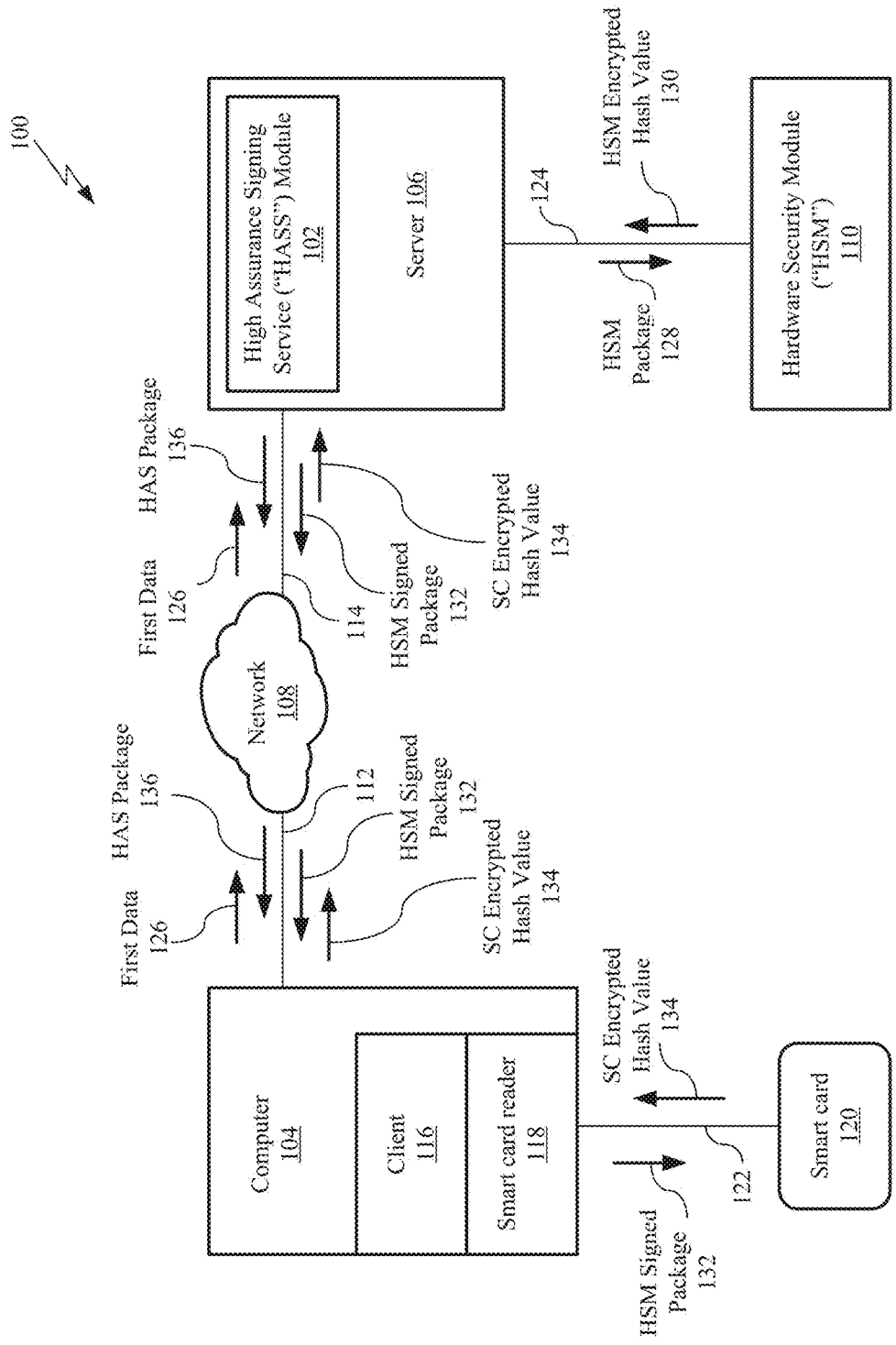
FIG. 1 is a system block diagram of an example of an implementation of a double authentication system ("DAS") for electronically signing original data in accordance with the invention.

Disclosed is a double authentication system ("DAS") for electronically signing a first data from a user having a smart card, where the smart card has a personal identification number ("PIN"). As an example, the DAS may include a client module, high assurance signing service ("HASS") module communication with the smart card and the HASS module is in signal communication with the client module and the HSM. The HASS module is configured to receive the first data, and, in response, query the user for a confirmation that the first data is to be electronically signed. The HSM has a private key and is configured to receive a HSM package from the HASS module, and, in response, produce a HSM encrypted hash value with the private key of the HSM. The HSM then passes the HSM encrypted hash value to the HASS module. The HASS module is further configured to produce the HSM package from at least the first data and a HSM signed package that includes the HSM package combined with the HSM encrypted hash value. Moreover, the HASS module is configured to pass the HSM signed package to the client module. The client module is configured to query the user for the PIN of the smart card and, in response, pass the HSM signed package to the smart card for production of a smart card ("SC") encrypted hash value. The client module is also configured to receive the SC encrypted hash value, and pass the SC encrypted hash value to the HASS module, where the HASS module is configured to receive the SC encrypted hash value and, in response, produce a high assurance signed package ("HAS package").

In general, the DAS utilizes a multistep approach for electronically (usually "digitally") signing a first data (such as, for example, a document) with multiple layers of signature and authentication. This approach includes securing the first data by electronically signing the first data with an encrypted hash that is not accessible by a client in addition securing the first data with smart card hash that is accessible by the client. In this example, the HSM is only accessible by a server and provides the encrypted hash that is not accessible by the client.

As such, the DAS utilizes an approach for securing the first data (such as, for example, digital documents) against modification utilizing two layers of security, with one layer never accessible by a client. In this approach, two digital signature techniques are combined to achieve digital signatures with higher assurance than achievable by either technique alone, where the first technique is a smart card digital signature, and the second technique is a trustworthy signing service incorporating the HSM. This double signature approach of the DAS utilizes the smart card to accomplish one layer of digital signature and it utilizes a secure signing service (i.e., the HSM) to ensure that the user actually knows what he or she is electronically signing the first data.

As an example of operation, the DAS performs a method that includes the steps of receiving the first data from the user at the HASS module of the DAS, querying the user for a confirmation that the first data is to be electronically signed, and generating the HSM package for transmission to the HSM. The DAS then generates the HSM encrypted hash value from the HSM package with the private key of the HSM, generates the HSM signed package (where the HSM signed package includes the HSM package and the HSM encrypted hash value), and queries the user for the PIN. The DAS then passes the HSM signed package to the smart card and, in response, receives the SC encrypted hash value corresponding to the HSM signed package. In response, the DAS produces the HAS package from the HSM signed package and SC encrypted hash value.

As an example, the DAS addresses the situation where a smart card is left in a smart card reader for prolonged periods of time. In a conventional system, a system message may appear instructing the user to remove their smart card from the smart card reader, but in this situation the smart card is still susceptible to malware until the smart card is actually removed from the smart card reader. By contrast, examples of implementations (i.e., embodiments) of the present invention double sign any first data, such that transactions originating in a lower assurance environment can be verified and double signed in a higher assurance environment resulting in a raising of the assurance level of the transaction to the higher assurance level.

Turning to FIG. 1, a system block diagram of an example of a DAS 100 for electronically signing original data is shown in accordance with the invention. The DAS 100 may include a HASS 102 that is configured to operate in combination with a computer 104, server 106, a network 108, and a HSM 110. In this example, the computer 104 and server 106 may be in signal communication with the network 108 via signal paths 112 and 114, respectively. As such, the computer 104 may be in signal communication with the server 106 via signal paths 112 and 114 and network 108. The computer 102 may be any computing device, controller, processor, or microprocessor controlled device that is able to execute a plurality of machine encoded instructions. Examples of the computer 104 may include a laptop or desktop personal computer, microcomputer, mini-computer, personal digital assistant ("PDA"), tablet, smart device, digital signal processor ("DSP"), application specific integrated circuit ("ASIC"), field-programmable gate array ("FPGA"), or other computing devices controlled by a state machine. In this example, the computer 102 may include a client module 116 (generally referred to simply as the "client" 116) and a smart card reader 118. The computer 104 may be in signal communication with the smart card 120 of a user via signal path 122. In this example, the client 116 may be a hardware module, software module, or both that allows access to the HASS 102 provided by the server 106 via a combined signal path that includes the network 108 and signal paths 112 and 114. In general, the computer 104 may connect to the network 108 via a network interface, such as a modem or network controller (not shown) in signal communication with the computer 104. Examples of network 108 include the Internet, a packet network, Ethernet network, token ring, public switching telephone network ("PSTN"), personal communications service ("PCS") network, or other similar types of networks. In this example, the server 106 may also be in signal communication with the HSM 110 via signal path 124. The HSM 110 may be optionally external (either local or remote) or located within the server 106.

It is appreciated by those of ordinary skill in the art that the circuits, components, modules, and/or devices of, or associated with, the improved computer 104 and server 106 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the smart card 120 may be utilized to authenticate an identity of a user of the smart card 120. Typically the smart card 120 employs a public key infrastructure ("PKI") and stores an encrypted digital certificate issued from the PKI provider along with other relevant information. Examples of the smart card 120 include the United States ("U.S.") Department of Defense ("DoD") Common Access Card ("CAC"), other cards used by other governments for their citizens, or consumer smart cards that utilize integrated circuits ("ICs") such as, for example, smart chip technology utilizes by some European and U.S. financial institutions. If the smart card 120 includes biometric identification data, the smart card 120 may provide superior two, or three, factor authentication.

The smart card 120 may be a cryptographic smart card that may be utilized for a single sign-on. Typically, advanced smart cards currently in use include specialized cryptographic hardware that utilize algorithms such as, for example, the Rivest, Shamir, and Adleman algorithm ("RSA") and the digital signature algorithm ("DSA"). In the example of the smart card 120 being a cryptographic smart card, the smart card 120 generates key pairs on the smart card 120, to avoid the risk of having more than one copy of the key because by design there usually is no way to extract private keys from a smart card 120. In this example, the most common way to access the cryptographic smart card 120 functions on the computer 104 is to use a vendor-provided PKCS#11 library. As an example, a cryptographic service provider ("CSP") application program interface ("API") is supported in Microsoft Windows®. In general, the most widely utilized cryptographic algorithms in smart cards (excluding the global system for mobile communications ("GSM") so-called "crypto algorithm") are Triple data encryption standard ("DES") and RSA. The key set is usually loaded via DES or generated utilizing RSA on the smart card 120 at an initialization stage. In this example, the smart card 120 may also support the National Institute of Standards and Technology ("NIST") standard for Personal Identity Verification, FIPS 201.

The server 106 may also have a network interface (not shown) to enable connection to the network 108 via signal path 114. Furthermore, as described earlier, the server 106 may include or be in signal communication with the HSM 110 via signal path 124. The server 106 may be a computing device (such as, for example a computer acting as a server) that is capable of executing a plurality of instructions that provide for multiple connections with other computers (including computer 104) or applications. The server 106 may be executing a plurality of instructions for the HASS 102 that is in signal communication with and programmatically accesses the HSM 110. The server 106 may also have an operating system that aids in the execution of the HASS 102, such as, for example, UNIX®, SOLARIS®, LINUX®, or Windows® Server. The HASS 102 may be implemented as a process or service running on the server 106 and may include hardware, software, or a combination of both.

The HSM 110 may have a programmatic interface (also referred to as an application program interface) via signal path 124 that is accessible by the HASS module 102. In this example, the HSM 110 is not viewable or directly accessible from the clients, such as client 116 on computer 104. The HSM 110 may receive hash input data (such as HSM package 128) from the smart card 120 (via the HASS module 102) that is encrypted with a private key. The resulting encrypted hash data (such as HSM encrypted hash value 130) from the HSM 110 is then returned to the HASS module 102. The HSM 110 may be implemented as a combination of hardware, software, or both that resides in the server 106 or at a standalone controller (not shown) that is a controlled piece of hardware executing software that is in signal communication with the server 106 via signal path 124. Preferably, the private key may be implemented and secured in hardware for additional security. Additionally, for added security the HSM 110 may only be in signal communication with the HASS module 102.

As an example of operation of the DAS 100, a user (not shown) may generate and submit original data (which may be, for example, a document or data file) to the DAS 100 via the client 116. This original data may be combined with optional additional information (such as, for example, identification information for a document) that may generally be referred to as a first data 126. In this example, the user desires to electronically sign the first data 126 and the DAS 100 is configured to confirm with high assurance that the user is in fact desiring to and electronically signing the first data 126. This first data 126 may be encoded at the computer 104 with the client 116 and transmitted to the HASS module 102 at the server 106 via a combined signal path that includes signal path 112, network 108, and signal path 114. Once the HASS module 102 receives the first data 126, the HASS module 102 may query (i.e., prompt and request) the user (via the client 116) to confirm that the user does in fact desire to electronically sign the received first data 126. Once the user confirms (and the HASS module 102 receives the confirmation from the user), the HASS module 102 formats the received first data 126 to produce a HSM package 128 and passes the HSM package 128 to the HSM 110 via signal path 124. The HSM package 128 may include numerous types of information, for example, the first data 126, a time-stamp, the identity of the user that is going to sign, and a public key for the user. The HSM 110 receives the HSM package 128 and, in response, produces a hash of the HSM package 128 and encrypts the HSM package 128 with a private key that resides in the HSM 110. The resulting HSM encrypted hash value 130 is then returned to the HASS module 102. The HASS 102 then combines the HSM encrypted hash value 130 with HSM package 128, formats the combined package of data for transmission, and then transmits the combined package of data back to the client 116 as HSM signed data 132, which is also referred to (interchangeably) as a HSM signed package 132 because it is a package of data that includes at least the first data 126 and a first electronic signature generated from the HSM 110 utilizing the private key of the HSM 110. Once the HSM signed package 132 is received by the client 116, the client module queries the user for a PIN of the smart card 120, which enables the private key contained within the smart card 120. The HSM signed package 132 is then passed to the smart card 120 via signal path 122. Once received, the smart card 120 produces a hash of the received HSM signal package 132, encrypts the new hash of the received HSM signal package 132 with the private key of the smart card 120, and passes the resulting SC encrypted hash value 134 to the client 116 via signal path 122. The client 116 then passes the SC encrypted hash value 134 to the HASS 102 (via signal path 112, network 108, and signal path 114) and the HASS module 102 utilizes the SC encrypted has value to produce a HAS package 136 that is a data structure (i.e., a package of data) that includes at least the first data 126, the first electronic signature generated from the HSM 110 utilizing the private key of the HSM 110, and a second electronic signature generated by the smart card 120 utilizing the private key of the smart card 120. The HAS package 136 may then be passed back to the client 116 via combined signal path that includes signal path 114, network 108, and signal path 112. In this example, the HASS module 102 may also be configured to utilize a public key of the HSM 110 to generate the HSM signed package 132.

Figure 2:
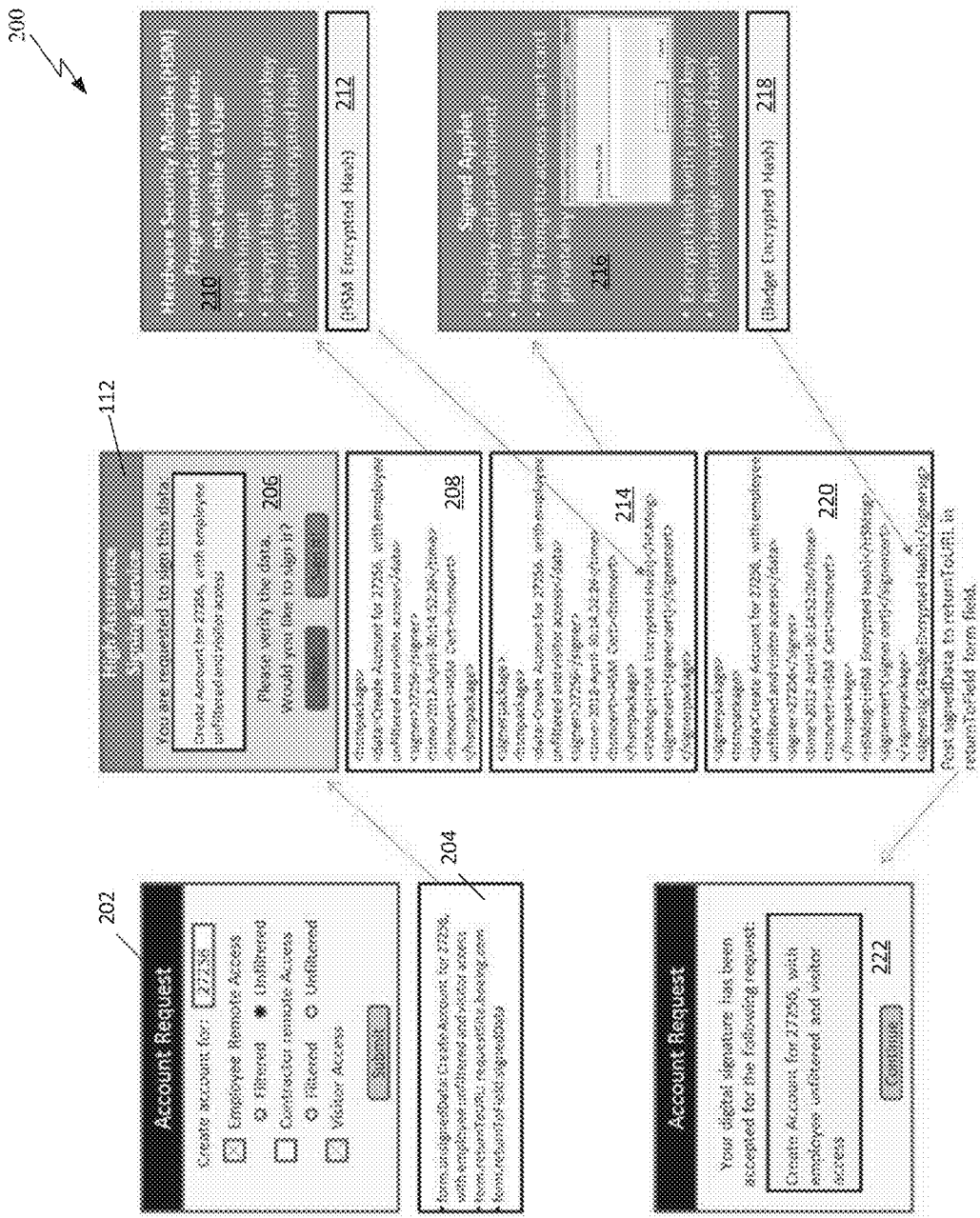
FIG. 2 is system diagram of an example of an implementation of the operation of the DAS shown in FIG. 1 in accordance with the invention.

Turning to FIG. 2, a system diagram 200 of an example of an implementation of the operation of the DAS 100 of FIG. 1 is shown in accordance with the invention. In this example, a user utilizes the DAS 100 to create a company badge for another person (either an employee or visitor). The user, via client 116 on computer 104, requests an account 202. When an account is requested, a graphical user interface ("GUI") may be generated or provided by the client 116 in which the user enters identification information such as, for example, identification of who the account is being created for, employee or contractor, if the person is a visitor, etc. The user may also supply the original data that is to be electronically signed. The original data may be, for example, a document. The identification information and original data (referred to as the "first data" 126 in FIG. 1) to be electronically signed may then be encoded 204 at the computer 104 and transmitted to the HASS module 102 over the network 108. Once the HASS module 102 receives the first data 126, the HASS module 102 may provide a GUI window to appear on the computer 104 via the client 116 to confirm that the first data 126 needs to be electronically signed (also known as "digitally signed") or otherwise secured 206. Upon the HASS module 102 receiving confirmation from the user, the first data 126 to be signed may be formatted for transmission 208 and then be passed to the HSM 110 (via HSM package 128), where the HSM 110 produces a hash of the formatted first data 128 (i.e., hash input data) and encrypts the hash input data with a private key that resides in the HSM 110. The resulting HSM encrypted hash value 130 is then be returned to the HASS module 102, where the HSM encrypted hash value 130 may be combined with the first data 126 to be electronically signed, formatted for transmission, and transmitted to the client 116. This resulting formatted data 214 constitutes the HSM signed data 214 (shown as HSM signed package 132 in FIG. 1), which is the first of two electronic signatures of the first data 126 to be signed. The client 116 may then again display a GUI window or message asking for a smart card 120 PIN, which enables use of a smart card 120 private key 216. The PIN is provided at the client 116 and utilized at the smart card 120. The HSM signed data 214 may then be transmitted to the smart card 120 by the client 116, where the smart card 120 produces another hash of the HSM signed data 214 and the resulting new hash of data (herein referred to as the "second data") from the HSM signed data 214 is encrypted with a private key that resides in the smart card 120. The resulting smart card 120 encrypted hash value (i.e., the SC encrypted hash value 134 shown in FIG. 1) may then be returned to the HASS module 102 where it is then encrypted with a badge encrypted hash 218 to produce a badge encrypted third data at the HASS 102. The badge encrypted third data then may be combined with the HSM signed data 214, encoded 220 to produce a combined fourth data (shown as HAS package 136 in FIG. 1), and transmitted back to the client 116. This encoded 220 combined fourth data constitutes the doubly electronically signed data. A GUI window or message at the client 116 may then be provided to indicate success or failure of the electronic signing or securing of the combined fourth data (i.e., HAS package 136) that may be for example, a document.

In this example, it is appreciated by those of ordinary skill in the art that the term "hash" has be utilized to describe digital data of a fixed size that has been mapped from digital data originally of arbitrary size utilizing a hash function. Generally, the values returned from a hash function are known as "hash values," "hash codes," "hash sums," or simply "hashes." In cryptography, a cryptographic hash function allows for easy verification that a given input data maps to a predetermined hash value, but if the input data is unknown, it is deliberately difficult to reconstruct that input data (or equivalent alternatives) by just knowing the stored hash value. Examples of hash approaches include the division-remainder method, folding method, Radix transformation method, and digit rearrangement method. Using division-remainder method, the size of the number of items in the table is estimated. The resulting number is then used as a divisor into each original value or key to extract a quotient and a remainder. The resulting remainder is the hashed value. Because this method is liable to produce a number of collisions, any search mechanism utilizing this method would also have to be able to recognize a collision and offer an alternate search mechanism if necessary. In the folding method, the method divides the original value (i.e., the digits in this case) into several parts, adds the parts together, and then uses the last four digits (or some other arbitrary number of digits that will work) as the hashed value or key. In the Radix transformation method, the value or key is digital, so the number base (or radix) can be changed resulting in a different sequence of digits. For example, a decimal numbered key could be transformed into a hexadecimal numbered key and high-order digits could be discarded to fit a hash value of uniform length. Using the digit rearrangement method, the method takes part of the original value or key such as digits in positions 3 through 6, reversing their order, and then using that sequence of digits as the hash value or key. Additionally, there are several known hash functions used in cryptography. These include the message-digest hash functions MD2, MD4, and MD5, used for hashing digital signatures into a shorter value called a message-digest, and the Secure Hash Algorithm ("SHA"), a standard algorithm, that makes a larger (i.e., 60-bit) message digest (it is appreciated that different versions of SHA may have different message digest lengths) and is similar to MD5. It is appreciated by of ordinary skill in the art that a hash function that works well for database storage and retrieval, however, might not work as well for cryptographic or error-checking purposes.

Figure 3:
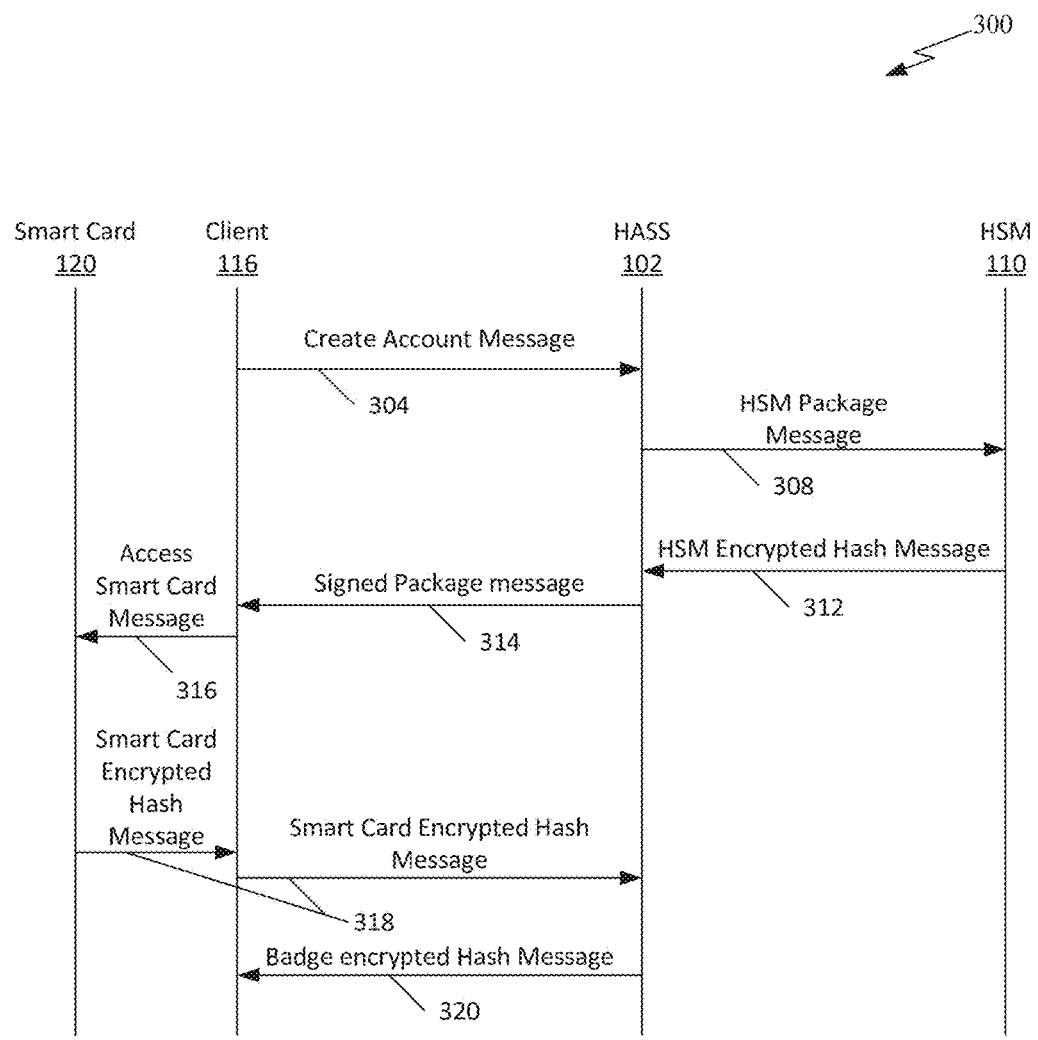
FIG. 3 is a signal-flow diagram of an example of an implementation of the communication between the elements shown in FIG. 1 in accordance with the present invention.

In FIG. 3, a signal-flow diagram 300 of example of an implementation of the communication between the client 114, HASS module 102, HSM 110, and smart card 120 of FIG. 1 is shown in accordance with the invention. The communication starts with a user at the computer 104 (via client 116) requesting an account to be provisioned with a create account message 304 being sent from the client 116 to the HASS module 102 (via signal paths 112 and 114 and network 108) that identifies the first data 126 to be secured or electronically signed. The HASS module 102 then verifies that the first data 126 is to be digitally signed by preparing an HSM Package 128 comprising the first data 126 to be electronically signed, the public key of the HSM 110, the identity of the signer, a timestamp, and perhaps other information. The HSM Package 128 is submitted to the HSM 110 in the HSM Package Message 308. In response, the HSM 110 generates a hash of the HSM Package, and encrypts the hash using a private key known only to the HSM 110. The HSM encrypted hash value 130 is returned to the HASS module 102 in the HSM Encrypted Hash Message 312. The HASS module 102 then prepares a Signer Package (i.e., HSM signed package 132 in FIG. 1) including the HSM Package, the public key of the HSM 110, and the HSM Encrypted Hash. The HASS module 102 then sends the Signer Package to the client 116 in a Signer Package Message 314. The client 116 (or a signed applet under control of the client 116 if the client 116 is a web browser) prompts the user for the PIN of the smart card 120 to enable use of the smart card 120. The client 116 then submits the smart card 120 PIN and Signer Package (i.e., HSM signed package 132) to the smart card 120 in the Access Smart Card Message 316. The smart card 120 then generates a hash of the Signer Package, and encrypts the hash using a private key known only to the smart card 120. The smart card 120 encrypted hash (i.e., SC encrypted hash value 134) is returned in the Smart Card Encrypted Hash Message 318 to the client 116, which forwards the Smart Card Encrypted Hash Message 318 to the HASS module 102 via signal paths 112 and 114 and network 108. The HASS module 102 affixes the SC encrypted hash value 134 to the Signer Package (i.e., HSM signed package 132) resulting in HAS package 136 and returns the HAS package 136 to the client 116 in a Doubly Signed Data Message 320 via signal paths 114 and 112 and network 108. The client 116 may then provide the Doubly Signed Data (i.e., HAS package 136) to another system that is configured to verify both electronic signatures before acting on the request for account creation.

Figure 4:
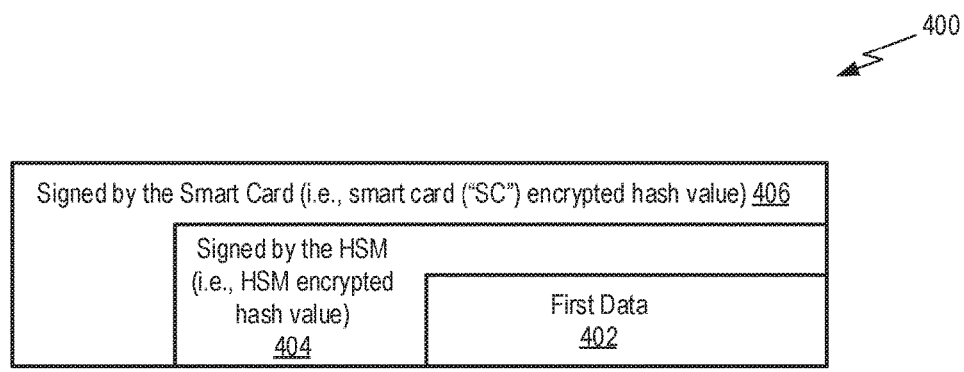
FIG. 4 is a block diagram of an example of an implementation of a data structure that is created as the result of the operation of the DAS as described in FIGS. 1 through 3.

Turning to FIG. 4, a block diagram of an example of an implementation of a data structure 400 of the first data 402 that is the result of the communication between the client 116, HASS module 102, smart card 120 and HSM 110 (of FIGS. 1 through 3) is shown in accordance with the invention. The first data 402 (i.e., the original data provided by the user) is utilized to derive a hash value that is then encrypted at the HSM 110 and results in an encrypted hash (i.e., HSM encrypted hash value 130) constituting the resulting HSM signature data. The HSM signature data (i.e., HSM encrypted hash value 130) 404 is typically tag data that is appended to the first data 402. The first data 402 and encrypted hash 404 is then processed by the private encryption key of the smart card 120 and results in a value (i.e., SC encrypted hash value 134) that is appended as an additional tag data to the data 400 and acts as a smart card 120 signature (or badge encrypted hash) 402. As a result, in this example, there are two layers of encryption in the resulting data structure 400 and the private key for the HSM 110 is never accessed by the client 116.

Figure 5:
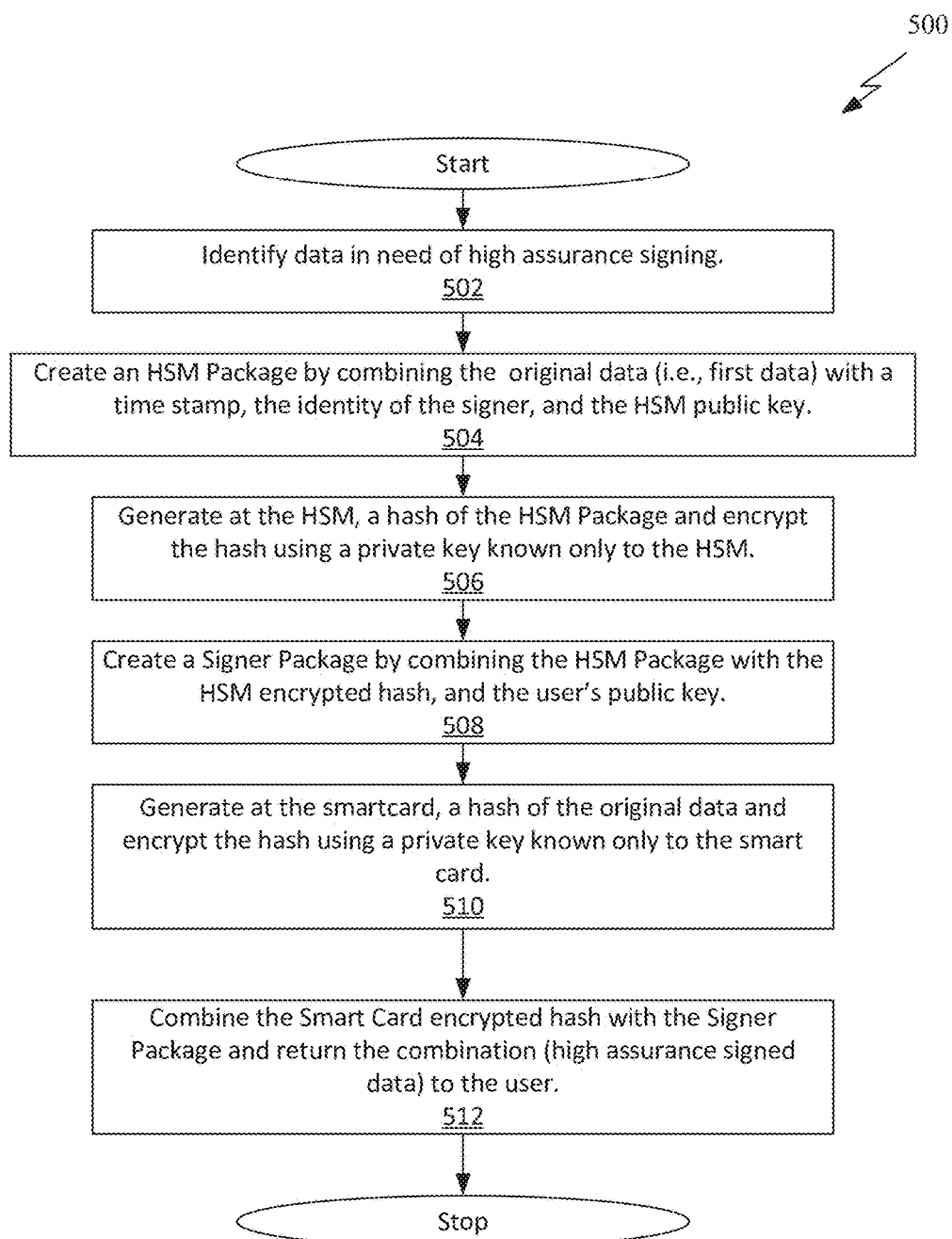
FIG. 5 is a flow diagram of an example of an implementation of the operation of the DAS described in FIGS. 1 through 4 in accordance with the invention.

In FIG. 5, a flow diagram 500 of an example of an implementation of process performed by the HASS module 102 (of FIG. 1) is shown in accordance with the invention. The process starts when a user at a client 116 identifies original data (previously referred to as first data) in need of a high assurance electronic signature 502. The client 116 sends a create account message 304 to the HASS module 102 and the HASS module 102 creates an HSM package by combining the first data with a time stamp, the identity of the signer, and the HSM public key in step 504. The HSM package is then sent to a HSM 110. The HSM generates an encrypted hash value using a private key known only to the HSM constituting the HSM signature in step 506. The HASS module 102 prepares a signer package (in step 508) by combining the first data to be signed with the identity of the signer, a timestamp, the HSM encrypted hash, and the public key of the user. The user may then provide a PIN to enable use of the smart card 120 or other badge security in order to access a private key to generate a badge encrypted hash value constituting the smart card 120 signature (i.e., the high assurance signed data) in step 510. The high assurance signed data is then provided to the user in step 512.

Turning to FIG. 4, a block diagram of an example of an implementation of a data structure 400 of the first data 402 that is the result of the communication between the client 116, HASS 102, smart card 120 and HSM 110 (of FIGS. 1 through 3) is shown in accordance with the invention. The first data 402 (i.e., the original data provided by the user shown as first data 126 in FIG. 1) is utilized to derive a hash value that is then encrypted at the HSM 110 and results in an encrypted hash (i.e., HSM encrypted hash value 130) constituting the resulting HSM signature data. The HSM signature data (i.e., HSM encrypted hash value 130) 404 is typically tag data that is appended to the first data 402. The first data 402 and HSM signature data 404 is then processed by the private encryption key of the smart card 120 and results in a value (i.e., SC encrypted hash value 134) that is appended as an additional tag data to the data 400 and acts as a smart card 120 signature (or badge encrypted hash) 406. As a result, in this example, there are two layers of encryption in the resulting data structure 400 and the private key for the HSM 110 is never accessed by the client 116.

What is claimed is:

1. A double authentication system ("DAS") for electronically signing a first data from a user, wherein the user has a smart card having a personal identification number ("PIN"), the DAS comprising:

a client module, wherein the client module is software located within a computer and the client module is in signal communication with the smart card;

a server having a high assurance signing service ("HASS") module, wherein
- the computer is remote from the server,
- the HASS module is remote from and in signal communication with the client module, and
- the HASS module is software that is capable of executing a plurality of instructions, whereby the server is capable of receiving the first data from the user via the client module, and, in response, query the user for a confirmation that the first data is to be electronically signed; and a hardware security module ("HSM"), wherein
- the HSM is remote from the computer,
- the HSM is in signal communication with the HASS module, has a private key, is configured to
  - receive a HSM package from the HASS module,
  - in response, produce a HSM encrypted hash value with the private key of the HSM, and
  - transmit the HSM encrypted hash value to the HASS module, wherein the HASS module is further configured to
- produce the HSM package from at least the first data,
- produce a HSM signed package that includes the HSM package combined with the HSM encrypted hash value, and
- transmit the HSM signed package to the client module, wherein the client module is configured to
- query the user for the PIN of the smart card,
- in response, transmit the HSM signed package to the smart card for production of a smart card ("SC") encrypted hash value,
- receive the SC encrypted hash value, and
- transmit the SC encrypted hash value to the HASS module, and wherein the HASS module is configured to
- receive the SC encrypted hash value and,
- in response, produce a high assurance signed package ("HAS package") that is passed to the user by way of the client module.

2. The DAS of claim 1, wherein the HSM package includes
a time-stamp,
an identity of the user, and
a public key of the HSM.

3. The DAS of claim 1, wherein the HASS module is configured to utilize a public key of the HSM to generate the HSM signed package.

4. The DAS of claim 1, wherein the first data originates at the client module.

5. The DAS of claim 4, wherein the HSM is also located within the server.

6. The DAS of claim 1, wherein the HAS package includes the HSM signed package and the SC encrypted hash value.

7. The DAS of claim 1, wherein the PIN is biometric data associated with the user.

8. A method of electronically signing a first data from a user with a double authentication system ("DAS"), wherein the user has a smart card having a personal identification number ("PIN"), the method comprising:

receiving the first data from the user at a high assurance signing service ("HASS") module of the DAS, wherein the HASS module is located at a server and the first data originates at a client module located within a computer remote from the HASS module;

querying the user for a confirmation that the first data is to be electronically signed;

generating a hardware security module ("HSM") package for transmission to a HSM;

generating a HSM encrypted hash value from the HSM package with a private key of the HSM;

generating a HSM signed package, wherein the HSM signed package includes the HSM package and the HSM encrypted hash value;

querying the user for the PIN of the smart card;

receiving a smart card ("SC") encrypted hash value corresponding to the HSM signed package;

producing a high assurance signed package ("HAS package") from the HSM signed package and SC encrypted hash value; and passing the HAS package to the user by way of the client module, wherein querying the user for a confirmation that the first data is to be electronically signed includes generating a first query for the user at the client module, wherein querying the user for the PIN of the smart card includes generating a second query for the user for the PIN at the client module, and wherein generating a HSM encrypted hash value from the HSM package with a private key of the HSM includes generating the HSM encrypted hash value at the HSM and passing the HSM encrypted hash value to the HASS module.

9. The method of claim 8, further including passing the HSM signed package to the smart card, wherein the smart card produces the SC encrypted hash value corresponding to the HSM signed package.

10. The method of claim 8, wherein the HSM is located at the server.

11. The method of claim 8, further including passing the HSM signed package to the client module.

12. The method of claim 8, further including passing the HSM signed package to the smart card, wherein the smart card produces the SC encrypted hash value corresponding to the HSM signed package.

13. The method of claim 8, wherein generating the HSM signed package includes generating the HSM signed package with a public key of the user combined with the HSM encrypted hash value and the HSM package.

14. The method of claim 8, wherein the HSM signed package includes:
a time-stamp,
an identity of the user, and
a public key of the HSM.

15. The method of claim 8, wherein the HAS package includes the HSM signed package and SC encrypted hash value.

16. The method of claim 8, wherein at the smart card further includes verifying a PIN for accessing the smart card.

17. A non-transitory computer readable medium containing machine readable instructions, that when executed perform a method of electronically signing a first data from a user with a double authentication system ("DAS"), wherein the user has a smart card having a personal identification number ("PIN"), comprising the steps of:

receiving the first data from the user at a high assurance signing service ("HASS") module of the DAS, wherein the HASS module is located at a server and the first data originates at a client module within a computer that is remote from the server;

querying the user for a confirmation that the first data is to be electronically signed;

generating a hardware security module ("HSM") package for transmission to a HSM;

generating a HSM encrypted hash value from the HSM package with a private key of the HSM;

generating a HSM signed package, wherein the HSM signed package includes the HSM package and the HSM encrypted hash value;

querying the user for the PIN of the smart card;

passing the HSM signed package to the smart card, wherein the smart card produces a smart card ("SC") encrypted hash value corresponding to the HSM signed package;

receiving the smart card SC encrypted hash value; and producing a high assurance signed package ("HAS package") from the HSM signed package and SC encrypted hash value, wherein the HAS package includes the HSM signed package and SC encrypted hash value, wherein querying the user for a confirmation that the first data is to be electronically signed includes generating a first query for the user at the client module, wherein querying the user for the PIN of the smart card includes generating a second query for the user for the PIN at the client module, and wherein generating a HSM encrypted hash value from the HSM package with a private key of the HSM includes generating the HSM encrypted hash value at the HSM and passing the HSM encrypted hash value to the HASS module.

18. The non-transitory computer readable medium of claim 17, further including passing the HSM signed package to the smart card, wherein the smart card produces the SC encrypted hash value corresponding to the HSM signed package.

* * * * *